United States Patent [19]

Reijnierse et al.

[11] Patent Number: 5,497,368
[45] Date of Patent: Mar. 5, 1996

[54] ROUTING METHOD FOR A HIERARCHICAL COMMUNICATIONS NETWORK, AND A HIERARCHICAL COMMUNICATIONS NETWORK HAVING IMPROVED ROUTING

[75] Inventors: Adrianus A. L. Reijnierse, Breda; Daan D. Velthausz, Doetinchem, both of Netherlands

[73] Assignee: Koninklijke PTT Nederland N.V., Groningen, Netherlands

[21] Appl. No.: 290,346

[22] Filed: Aug. 15, 1994

[30] Foreign Application Priority Data

Aug. 18, 1993 [NL] Netherlands ............. 9301428

[51] Int. Cl.$^6$ ................................. H04L 12/46
[52] U.S. Cl. ............... 370/54; 370/60; 370/94.3; 370/110.1
[58] Field of Search ............... 370/54, 60, 60.1, 370/68.1, 85.13, 85.14, 94.1, 94.2, 94.3, 110.1; 379/220; 395/200, 325

[56] References Cited

U.S. PATENT DOCUMENTS

| | | | |
|---|---|---|---|
| 4,887,259 | 12/1989 | Morita | 370/60 |
| 5,323,394 | 6/1994 | Perlman | 370/85.13 |
| 5,353,283 | 10/1994 | Tsuchiya | 370/60 |

OTHER PUBLICATIONS

ISO/IEC 10589, International Organization for Standardization (ISO/IEC), Geneva, Switzerland, First Edition, Apr. 30, 1992; pp. 1–150.

R. Perlman; "A Comparison Between Two Routing Protocols: OSPF and IS–IS"; Sep. 1991; pp. 18–24; IEEE Network Magazine.

A. Tanenbaum; Computer Networks; second edition; 1989; pp. 288–308; Prentice–Hall International; Amsterdam; The Netherlands.

V. Saksena; "Topological Analysis of Packet Networks"; Oct. 1989; IEEE Journal on Selected Areas in Communications; pp. 1243–1252.

K. Lee; "Distributed Routing Using Topology Database In Large Computer Networks"; 1988; pp. 0593–0602; IEEE INFOCOM '88; New Orleans, Louisiana.

Primary Examiner—Hassan Kizou
Attorney, Agent, or Firm—Frishauf, Holtz, Goodman, Langer & Chick

[57] ABSTRACT

A method and apparatus for selecting routes in a hierarchical communications network wherein a number of mutually isolated areas are provided at a first level, which areas are mutually linked at a second level. In the network, routing devices are provided at both levels. For selecting a route from a first area to a second area, use is made of routing information stored in the routing devices of the first level, relating to the first level and to reaching the nearest routing device of the second level. Use is also made, in the routing devices of the first level, of routing information relating to the second level.

21 Claims, 1 Drawing Sheet

ROUTING METHOD FOR A HIERARCHICAL COMMUNICATIONS NETWORK, AND A HIERARCHICAL COMMUNICATIONS NETWORK HAVING IMPROVED ROUTING

BACKGROUND OF THE INVENTION

The invention relates to a method of selecting routes in a communications network, as well as to a communications network in which such a method is applied. More specifically, the invention relates to a method of selecting routes in a communications network which comprises a number of mutually isolated areas at a first level, which areas are linked at a second level, in which network routing devices are provided at both levels for selecting routes, in which method for selecting a route from a first area to a second area use is made of a cost function and routing information stored in the routing devices, the routing information, stored in the routing devices of a particular area, relating to said area and to direct links from said area to routing devices of the second level, and at least some areas being directly linked to more than one routing device of the second level.

Several methods of selecting routes in communications networks are known. A method of the type described above is known as the "IS-IS protocol" (cf. reference [1]). For the transmission of routing information, this known routing protocol occupies the capacity of the network only to a very small extent since only a minimum amount of information relating to that part of the network situated outside the area is to be present within a particular area. The routing information present in a routing device of the first level, that is to say in a routing device located in a certain area, is essentially limited to the area concerned. The only routing information relating to the second level which is present within the areas relates to the direct links to routing devices of the second level (level two), that is to say the links to "adjacent" routing devices of the second level. In the IS-IS protocol, the routing information stored in the routing devices of the first level can therefore be said to relate exclusively to the respective area and the direct links of that area with routing devices of the second level.

As a result, although links within an area can be set up efficiently with the aid of the said protocol, there is the disadvantage that less efficient links are often selected mutually between the areas. In other words, because virtually no information relating to the second level is present at the first level and the costs of a total route can therefore not be foreseen, a less suitable link with the second level is often selected. Thus, an area cannot make any distinction between two routing devices, linked to said area, of the second level, whereas one of said routing devices at the second level may form a much shorter and/or cheaper link to another area. As a result, the routing at the second level is often not efficient, with the result that transmission capacity ("bandwidth") of the network is wasted.

It should be pointed out that the said cost function may be any function with the aid of which alternative routes may be compared. Thus, the cost function may be a function of the number of paths, the number of routing devices traversed, the number of kilometres, the delay encountered, the error probability, the throughput speed or the (usage) costs charged for a link. A combination of two or more such factors may also be used.

The publication "A Comparison between Two Routing Protocols: OSPF and IS-IS" (reference [2]) discloses the transfer of level 2 information to level 1 routing devices in the OSPF protocol. Due to this transfer of information, the OSPF protocol performs better with regard to interarea routes, as the routing devices of level 1 are able to choose better routes, i.e. routes having lower costs. In fact, in the OSPF protocol routing devices of a certain area contain information with respect to all possible destinations within the communications network, thus also with respect to destinations (partial networks with end users) in other areas. This does not only require a substantive amount of information to be stored in each routing device, but also reduces the effective capacity of the network, as updating this information requires large amounts of data to be transmitted between routing devices. The OSPF protocol, which provides almost complete routing information to all routing devices, has the benefit of an improved routing efficiency at the cost of a substantial overhead.

SUMMARY OF THE INVENTION

An object of the invention is to eliminate the disadvantages mentioned and other disadvantages of the existing routing methods by providing a routing method which makes possible a substantially improved routing and therefore a more efficient usage of the network, without occupying the existing network means to a greater extent. Another object of the invention is to provide an improved routing method which requires a minimum amount of additional information. A further object of the invention is to provide a useful extension of a routing protocol, such as the IS-IS protocol, while avoiding the drawbacks of the OSPF protocol. A still further object of the invention is to provide a communications network having an improved routing efficiency without requiring a substantive adaptation of the network resources, nor causing a significantly reduced network capacity.

In order to meet these and other objectives, a routing method as described in the preamble is according to the invention characterised in that additional routing information is stored in the routing devices of areas directly linked to more than one routing device of the second level, which additional routing information is supplied to the routing devices of the respective area from routing devices, directly linked to that area, of the second level and relates to the second level so that the routing device which is directly linked to said area and which minimizes the cost function is selected by routing devices of said area.

The invention is therefore based on the insight that, for a more efficient routing, more information, that is to say additional information relating to the second level, must be present at the first level. For this purpose, information should be supplied to the first level from the second level. In addition, the invention is based on the insight that a more efficient routing can be obtained at the second level by arranging for the areas to select a better access point to the second level, that is to say a more suitable routing device directly linked to an area. The selection of such an access point is, at the same time, based on the said information supplied from the second level.

The invention is further based upon the understanding that in order to minimize the amount of additional information required to improve the routing efficiency, the additional information should not relate to (internal routes of) other areas, but only to the second level which interconnects the areas.

According to a first embodiment of the method according to the invention, the additional routing information comprises the costs of a route from a routing device directly linked to an area to other areas. In other words, the costs of possible routes from a routing device adjoining a certain area to, preferably, all the other areas are supplied to the area concerned so that the routing devices of said area can take account of said costs in selecting a route. In making a selection from a plurality of routing devices, directly linked to an area, of the second level, that routing device can therefore be selected which incurs the lowest costs overall, and this is in contrast to a routing device of the second level which, although it can be reached at the first level at lower costs, entails higher costs at the second level.

This embodiment offers the advantage that a substantial improvement of the routing and, consequently, a substantial reduction of the costs of the selected routes is achieved with a minimum amount of additional routing information. In this embodiment, the information regarding the second level is condensed in the costs as presented by the routing devices directly linked to the areas.

According to a second embodiment of the method according to the invention, the additional routing information also comprises information relating to the topology of the second level. In other words, in this embodiment, not only cost information relating to the second level may be supplied to the first level but topological information may also be offered. On the basis of said topological information, which reproduces the structure of the network, and possibly the cost information, the routing devices of the first level are able to independently determine an optimum route. In this way, a further improvement of the efficiency of the routing can be achieved.

In the two embodiments mentioned, the additional routing information is updated periodically or after every change in the topology of the network (such as the disconnection or reinstatement of a link). For this purpose, for example, information relating to the mutual links is exchanged at the second level between the routing devices, in communications networks designed for packet switching, for example, by means of the transmission of link state packets. The costs of the possible routes are then (re-)calculated by the routing devices of the second level, after which the relevant results are supplied to the areas concerned by routing devices adjoining areas. Within the areas, this (additional) routing information is distributed by the routing devices present therein.

According to a further embodiment of the method according to the invention, the information relating to the second level is obtained by the transmission of data in data packets, the data packets registering the costs incurred on their route. In this case, the additional routing information is collected in a learning process, transmitted data packets registering the route followed and the costs associated therewith during the traversal of said route. This information is collected in a routing device at the final destination and reported back to the routing device associated with the source. Preferably, a route is also traversed in the reverse direction in order to determine any alternative routes and the costs thereof. Because other links may be selected by the routing devices of the network in the reverse direction, as a result of which other routes with different costs are encountered, various routes arise which, after the exchange of a number of data packets, are available to the routing device associated with the source as alternative routes. In this way, a routing device (associated with the source) of the first level is able to "learn" which route, and therefore which routing device, directly linked to the area concerned, of the second level entails the lowest costs for a particular destination area.

Although the invention will be explained below, in particular, with reference to the so-called "IS-IS protocol", the inventive idea is not limited to said protocol or to networks in which said protocol is used. Equally, the inventive idea is not limited to so-called connectionless packet-switched services such as ATM ("asynchronous transfer mode"). The invention can also be used in other communications services in which there is any form of routing, it being possible to use both fixed and non-fixed links in such services.

REFERENCES

[1] ISO standard 10589 ("IS-IS protocol").
[2] Perlman, R.: "A Comparison Between Two Routing Protocols: OSPF and IS-IS", IEEE Network Magazine, September 1991.
[3] Tanenbaum, A.S.: "Computer Networks", Amsterdam, 1989.
[4] Saksena, V.C.: "Topological Analysis of Packet Networks", IEEE Journal on Selected Areas in Communications, Vol. 7, No. 8, New York, October 1989.
[5] Lee, K.J., et al.: "Distributed Routing Using Topology Database in Large Computer Networks", IEEE Infocom, New Orleans, 1988.

The above publications are incorporated by reference in this text.

BRIEF DESCRIPTION OF THE DRAWING

The invention will be explained in greater detail below with reference to the drawing, in which.

DETAILED DESCRIPTION OF THE DRAWING

Figure 1:
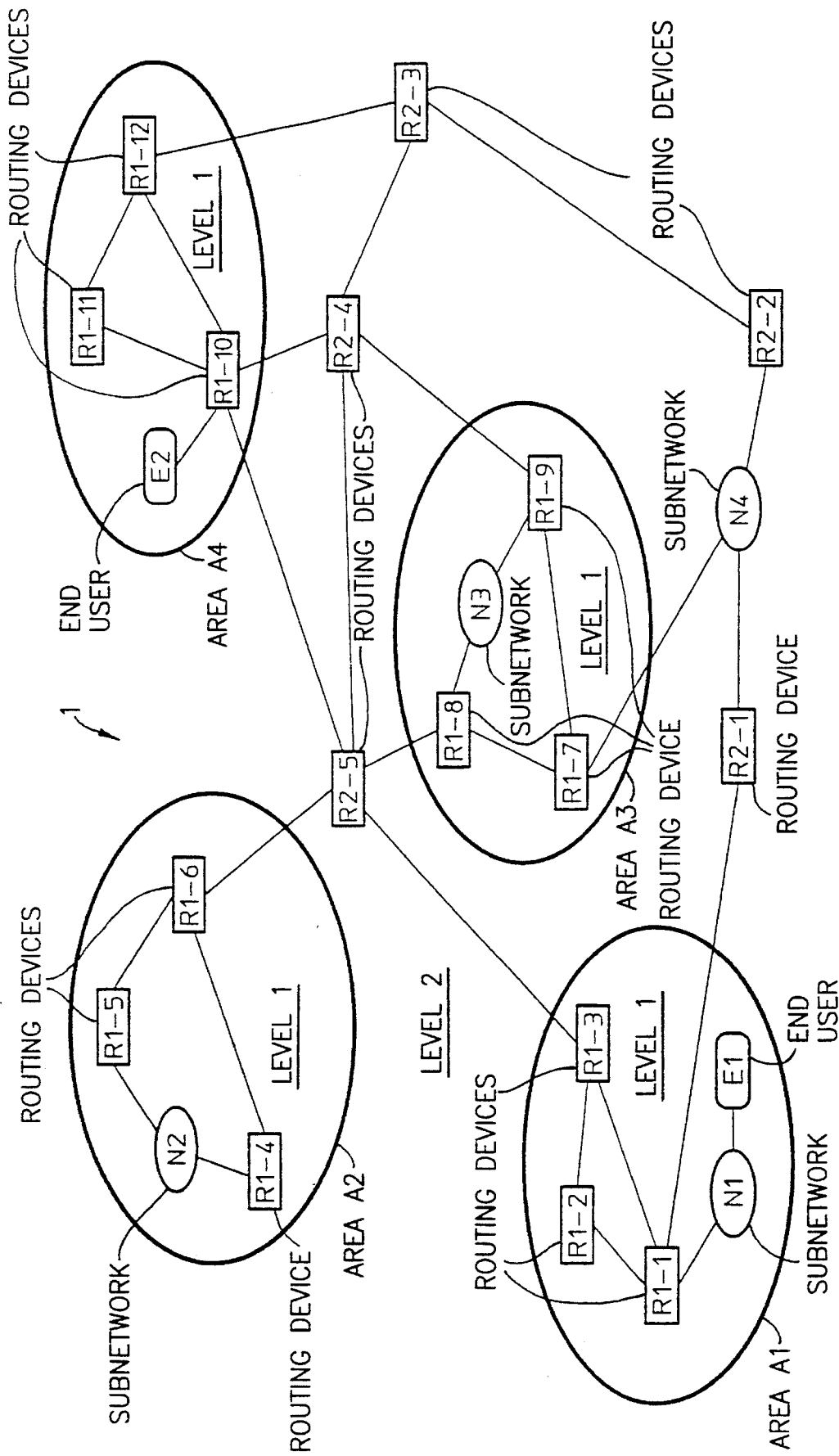
FIG. 1 shows schematically a communications network in which the invention is applied.

The communications network shown diagrammatically in FIG. 1 comprises a number of areas A1, A2, A3 and A4. Each of said areas comprises a network which itself may comprise one or more subnetworks. In each area, one or more routing devices are present which cater for the routing within the area concerned. Thus, the area A1, for example, contains the routing devices R1-1, R1-2 and R1-3. Furthermore, the area A1 contains a subnetwork N1 and an end user E1. The area A4, for example, likewise comprises routing devices R1-10, R1-11 and R1-12, and also an end user E2. Each area may contain further subnetworks and end users, which are not shown in FIG. 1 for the sake of clarity.

The parts of the network 1 which are located in the areas A1-A4 will be denoted as "level 1" (first level) and the parts outside the areas as "level 2" (second level). As is clear from FIG. 1, links between the various parts of level 1, that is to say between the various areas A1 to A4 inclusive, are possible only via that part of the network which belongs to level 2. The routing devices of level 2 therefore cater essentially for the mutual routing between the areas.

To transmit data (for example, in the form of data packets) from, for example, the end user (source) E1 to the end user (destination) E2, the end user E1 transmits the data concerned to the nearest routing device connected to it, viz. R1-1. According to the IS-IS protocol, the data should be passed by the routing device R1-1 to the nearest routing device of level 2, viz. the routing device R2-1. Said routing device R2-1, which is directly linked to the routing device R1-1 and therefore forms for the area A1 an adjoining routing device of the second level, should detect (for example, on the basis of information included in the data packet header) that the data are destined for the area A4 and should therefore transmit the data to the area A4 via the routing devices R2-2 and R2-3. Within the area A4, the data should be passed from level 1 to their final destination, the end user E2, by the routing devices (R1-12 and R1-10) present therein. From FIG. 1, it appears clearly, however, that the route followed in this manner from area A1 to area A4 via the routing devices R2-1, R2-2 and R2-3 is not the shortest route. Starting from R1-1, the route to R1-10 via R2-1 comprises five paths, but via R2-5 three paths. The invention now provides the possibility of selecting a shorter route through the network with only a small amount of additional information. On the basis of the additional information it is possible to determine that a shorter route is obtained by selecting from K1-1 not the nearest routing device of the second level, R2-1, as access to level 2 but by reaching level 2 via R1-3 and R2-5. It should be pointed out that in the examples discussed here, only the length of a route, expressed as the number of paths (subroutes between routing devices) is considered as "costs".

According to a first embodiment of the invention, the routing devices of level 2 calculate for adjoining areas the costs for each route from said routing device to another area. Referring to FIG. 1, this means that, for example, the routing device R2-1 uses the routing information available to it to calculate the costs of routes from area A1 to areas A2, A3 and A4 and then to provide the result of this calculation to the area A1. The routing device K2-5 likewise provides the costs to the area A1 of routes running via it from A1 to A2, A3 and A4. As a result, the routing devices of the area A1 are able, taking account of the costs both at level 1 and at level 2, to select the cheapest (in this case, the shortest) route from E1 to E2. In the case shown, the said route will therefore run not via R2-1 but via K2-5.

To use the first embodiment of the invention, the following measures should be taken in the network: the calculation, at level 2, by routing devices adjoining a certain area of the total costs of reaching other areas from the area concerned (or from the respective routing device of level 2, respectively) and the supplying of said information to the adjoining area ("supplying of cost measure" or "metric feeding"); the reception, at level 1, of the cost information from all the routing devices of level 2 adjoining the area, the calculation of the routing device with which a certain other area can be reached at minimum costs, and the storing of a table in which the best adjoining routing device of level 2 is specified for every routing device of the area and for every other (destination) area.

According to a second embodiment of the invention, routing information of level 2 is provided within the areas, and in fact, preferably in the form of so-called link state packets. Said packets reflect the topology of the network at level 2. As a result, the routing devices of level 2 between which a direct link is possible are known at level 1. With the aid of this information, for example, the routing device R1-1 can establish that, via R2-1, area A4 is four paths ("hops") removed from area A1, whereas the distance is only two paths via R2-5. It will be clear that the more efficient route via R2-5 will be selected on the basis of the above information, as a result of which the performance of the network can be appreciably improved. As a departure from the first embodiment, the routing devices of level 1 have sufficient information to calculate the costs of a route themselves. In other words, instead of calculating only cost information starting from certain adjoining routing devices of level 2, in this embodiment, the routing devices of the areas are themselves able to determine a route through the network and the costs associated therewith. As a result, a greater degree of flexibility is achieved, as a result of which the efficiency of the routing can be increased still further.

It will be clear to the person skilled in the art that, to implement this embodiment of the invention, suitable measures have to be taken in the network. Just as in the first embodiment, these measures can be implemented by means of suitable modifications of the control software of the routing devices, comprising for example, at level 2, the transmission of link state packets to adjoining routing devices of level 1. In the case of IS-IS, this would imply that the routing devices of level 1, identified by so-called IS-IS Hello PDUs, would receive part of the so-called Link State PDUs which are normally only exchanged in level 2. The said part comprises a list of (reachable) level 2 routing devices as well as the corresponding metric (costs). The level 1 routing device directly linked to a level 2 router receives this information and transmits it to other routing devices within the same area (flooding).

At level 1, the measures to implement the invention thus may comprise the storing of received link state packets, the transmission of received link state packets to other routing devices in the same area, the processing of link state packets of level 1 and 2, and the calculation on the basis thereof of the best adjoining routing device of level 2 to be used to reach a particular other region, and the storage of a table comprising destination areas and associated (best) routing devices of level 2.

It will be clear that the extent to which the invention can provide an improvement depends on the topology of the network and, in particular, on the number of routing devices of the second level which adjoin an area. Thus, in FIG. 1, the area A2 has only one adjoining routing device, viz. R2-5, with the result that no choice is possible in the case of A2. The area A3, on the other hand, has four adjoining routing devices, viz. R2-5, R2-4, R2-2 and R2-1 (the last two having a common link to A3), with the result that a large improvement in efficiency is, in principle, possible for this area.

According to a further embodiment of the invention, in the case of communication by means of data packets, additional routing information is obtained by registering the routes which have been followed by the data packets. In this case, the costs associated with these routes are also recorded. For this purpose, the header of a data packet is preferably expanded by three data fields, viz.: 1. "source-to-destination costs"; 2. "destination-to-source costs"; 3. "received from". During the traversal of a route from source to destination, the costs of the link (subroute) to the subsequent routing device are recorded in the "source-to-destination costs" field by each routing device. In this way, a packet collects the total costs of a route. In the "received from" field, each routing device also records the link from which the data packet was received. A data packet is then sent back to the source from the destination, the costs incurred being recorded in the "destination-to-source costs" field by the various routing devices. The data packet also contains the costs incurred on the route from source to destination. It should be pointed out that the route is preferably determined on both the outward journey and return journey in accordance with the first embodiment of the invention. The routing device associated with the source then compares the costs of the outward journey and the return journey. If the costs of the return journey are less than those of the outward journey, the route is altered accordingly for further data packets.

To summarize, in this embodiment of the invention, routes are selected in the first instance which have been determined in accordance with the first embodiment, and the routes selected in this way are altered if better routes come to light. It will be clear that an improvement with respect to the first embodiment can be obtained in this way. It is possible to reduce the additional transfer capacity required by not including the three abovementioned data fields in all the data packets but only in a number of data packets used at the beginning of a data transfer for selecting a route.

In a communications network designed for applying the invention, the routing devices are programmed so that they exchange and process the information needed to implement the invention in a suitable manner. Such a network may, in principle, be constructed using known components, account being taken of, inter alia, the memory capacity needed to store the additional routing information.

As has been stated above, the cost function may also consider factors other than the number of paths. The delay which occurs on a particular route may also form a suitable cost factor. In this case, it may be advantageous to include not only the delay on the individual paths between the routing devices but also the delay in the routing devices themselves in order to arrive at a more realistic measure of the costs.

It will be clear that the invention is not limited to the embodiments disclosed above and that many variations and extensions are possible without departing from the spirit and scope of the present invention. Thus, it is possible, for example, to calculate the optimum route from a routing device of level 1 to another area on the basis of cost information not in said routing device itself or in other routing devices within the same area but in routing devices of level 2 after which the latter routing devices supply the identity of the optimum adjoining routing device determined in this way to the area. However, additional information relating to the second level will always provide a better or cheaper route from source to destination.

What is claimed is:

1. A method of providing routing information and for selecting routes in a communications network comprising a number of mutually isolated areas (A1, A2, A3, A4) at a first level, said first level areas (A1 A2 A3 A4) being linked at a second level; and routing devices (R1-1, R1-2 ..., R2-5) provided at both said first and second levels for selecting routes on the basis of a cost function and routing information stored in said first level routing devices (R1-1, R1-2, ...); and wherein at least some first level areas (A1, A3, A4) are directly linked to more than one second level routing device (A1: R2-1 and R2-5; A3: R2-1, R2-2, R2-4 and R2-5; A4: R2-3, R2-4 and R2-5);

the method comprising the steps of:

providing to the first level routing devices (e.g., R1-1, R1-2, R1-3) of a given first level area (e.g., A1), routing information relating to said given first level area (A1) and to direct links from said given first level area (A1) to second level routing devices (R2-1, R2-5);

providing additional routing information to first level routing devices (R1-1, R1-2, ...) of first level areas (A1, A3, A4) which are directly linked to more than one second level routing device (A1: R2-1 and R2-5; A3: R2-1, R2-2, R2-4 and R2-5; A4: R2-3, R2-4 and R2-5), said additional routing information relating only to routing information of second level routing devices and being provided by second level routing devices (R2-1, R2-5) which are directly linked to said given first level area (A1);

determining costs of alternative communication routes from said first-mentioned routing information and said additional routing information; and selecting a communication route from said alternative communication routes.

2. A method according to claim 1, wherein said step of selecting a route from said alternative communication routes comprises selecting a lowest cost communication route from said alternative communication routes.

3. A method according to claim 1, wherein said additional routing information comprises costs of a route from a second level routing device directly linked to a first level area to other first level areas.

4. A method according to claim 3, wherein said additional routing information further comprises information relating to a topology of said second level.

5. A method according to claim 4, further comprising updating said additional routing information after every change in topology of said second level.

6. A method according to claim 1, further comprising updating said additional routing information after every change in topology of said second level.

7. A method according to claim 1, further comprising periodically updating said additional routing information.

8. A method according to claim 1, wherein said additional routing information is provided by transmitting data in data packets between a pair of routing devices, said data packets registering cost incurred on their transmitted route.

9. A method according to claim 8, wherein said data packets are also transmitted in a reverse direction between said pair of routing devices to determine further alternative routes and costs thereof.

10. A method according to claim 8, further comprising periodically updating said additional routing information.

11. A method according to claim 8, further comprising updating said additional routing information after every change in topology of said second level.

12. A method according to claim 1, comprising storing said additional information in second level routing devices which are directly linked to said given first level area (A1).

13. In a communications network comprising a number of mutually isolated areas (A1, A2, A3, A4) at a first level, said first level areas (A1, A2, A3, A4) being linked at a second level; and routing devices (R1-1, R1-2 ..., R2-5) provided at both said first and second levels for selecting routes on the basis of a cost function and routing information stored in said first level routing devices (R1-1, R1-2, ...); and wherein at least some first level areas (A1, A3, A4) are directly linked to more than one second level routing device (A1: R2-1 and R2-5; A3: R2-1, R2-2, R2-4 and R2-5; A4: R2-3, R2-4 and R2-5);

the improvement comprising the combination of:

means for providing to the first level routing devices (e.g., R1-1, R1-2, R1-3) of a given first level area (e.g., A1), routing information relating to said given first level area (A1) and to direct links from said given first level area (A1) to second level routing devices (R2-1, R2-5);

means for providing additional routing information to first level routing devices (R1-1, R1-2, ...) of first level areas (A1, A3, A4) which are directly linked to more than one second level routing device (A1: R2-1 and R2-5; A3: R2-1, R2-2, R2-4 and R2-5; A4: R2-3, R2-4 and R2-5), said additional routing information relating only to routing information of second level routing devices and being provided by second level routing devices (R2-1, R2-5) which are directly linked to said given first level area (A1);

means for determining costs of alternative communication routes from said first-mentioned routing information and said additional routing information; and means for selecting a communication route from said alternative communication routes.

14. A communications network according to claim 13, wherein the additional routing information comprises costs of a communication route from a second level routing device which is directly linked to said given first level area, to other first level areas.

15. A communications network according to claim 13, wherein the additional routing information comprises information relating to a topology of the second level.

16. A communications network according to claim 15, wherein the additional routing information is updated after every change in the topology of the second level.

17. A communications network according to claim 15, wherein the additional routing information is updated periodically.

18. A communications network according to claim 13, wherein the additional routing information is updated periodically.

19. A communications network according to claim 13, wherein said means for providing the additional routing information includes means for transmitting data in data packets between a pair of routing devices, the data packets registering costs incurred on their transmitted route.

20. A communications network according to claim 19, wherein the data packets are transmitted in a reverse direction between said pair of routing devices to determine further alternative routes and costs thereof.

21. A communications network according to claim 13, wherein data communication is carried out on the basis of the IS-IS protocol.

* * * * *